US012777347B2

(12) United States Patent
Debenedetti et al.

(10) Patent No.: US 12,777,347 B2
(45) Date of Patent: Oct. 27, 2026

(54) FRONTHAUL NETWORK ROUTE TRACING

(71) Applicant: Telefonaktiebolaget LM Ericsson (publ), Stockholm (SE)

(72) Inventors: Paolo Debenedetti, Genoa (IT); Paola Iovanna, Pisa (IT); Fabio Cavaliere, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 415 days.

(21) Appl. No.: 18/258,436

(22) PCT Filed: Dec. 22, 2020

(86) PCT No.: PCT/EP2020/087719
§ 371 (c)(1),
(2) Date: Jun. 20, 2023

(87) PCT Pub. No.: WO2022/135705
PCT Pub. Date: Jun. 30, 2022

(65) Prior Publication Data
US 2024/0040407 A1 Feb. 1, 2024

(51) Int. Cl.
*H04W 24/04* (2009.01)
*H04L 41/0659* (2022.01)
(Continued)

(52) U.S. Cl.
CPC ......... *H04W 24/04* (2013.01); *H04L 41/0659* (2013.01); *H04L 43/10* (2013.01); *H04L 45/28* (2013.01)

(58) Field of Classification Search
None
See application file for complete search history.

(56) References Cited

U.S. PATENT DOCUMENTS 8,195,977 B2 * 6/2012 Martin ................ H04L 43/0811 714/4.1
10,009,224 B1 * 6/2018 Peros ................. H04L 41/0869
(Continued)

FOREIGN PATENT DOCUMENTS

WO 2017147076 A1 8/2017
WO 2020204779 A1 10/2020

OTHER PUBLICATIONS

International Search Report and Written Opinion dated Oct. 11, 2021 for International Application No. PCT/EP2020/087719 filed Dec. 22, 2020, consisting of 10-pages.
(Continued)

*Primary Examiner* — Jason D Cardone
(74) *Attorney, Agent, or Firm* — Weisberg I.P. Law, P.A.

(57) ABSTRACT

Embodiments described herein relate to methods and apparatus for carrying and using fronthaul network tracing information. In an example, a method in a first RAN node includes recovering fronthaul network tracing information from a predetermined field of the frames in response to receiving frames of a predetermined type. The fronthaul network tracing information includes node identifier information for at least one other node of the fronthaul network through which the frame has traversed. The fronthaul network tracing information is associated with fronthaul routes of frames from other nodes through the fronthaul network to the first RAN node.

18 Claims, 6 Drawing Sheets

(51) Int. Cl.

| | |
|---|---|
| ***H04L 43/10*** | (2022.01) |
| ***H04L 45/28*** | (2022.01) |

(56) References Cited

U.S. PATENT DOCUMENTS

| | | | | |
|---|---|---|---|---|
| 10,135,670 | B2 * | 11/2018 | Wackerly | H04L 12/28 |
| 10,530,638 | B2 * | 1/2020 | Hanley | H04L 41/0668 |
| 10,931,530 | B1 * | 2/2021 | Rzehak | H04L 45/38 |
| 11,140,695 | B1 * | 10/2021 | Eyuboglu | H04W 72/535 |
| 2015/0207724 | A1 | 7/2015 | Choudhury et al. | |
| 2017/0237604 | A1 * | 8/2017 | Wackerly | H04L 12/28 370/218 |
| 2017/0318507 | A1 * | 11/2017 | Vikberg | H04W 40/36 |
| 2018/0006931 | A1 * | 1/2018 | Ellis | H04L 45/121 |
| 2019/0104458 | A1 * | 4/2019 | Svennebring | H04L 45/42 |
| 2020/0267801 | A1 * | 8/2020 | Jung | H04W 76/11 |
| 2020/0389806 | A1 * | 12/2020 | Charipadi | H04W 24/10 |
| 2022/0070091 | A1 * | 3/2022 | Park | H04L 45/76 |
| 2023/0273778 | A1 * | 8/2023 | Vierimaa | H04L 67/12 717/140 |
| 2026/0039982 | A1 * | 2/2026 | Pandey | H04Q 11/0062 |
| 2026/0121745 | A1 * | 4/2026 | Li | H04B 10/0791 |

OTHER PUBLICATIONS

Ericsson AB et al.; CPRI Specification V7.0; Common Public Radio Interface (CPRI); Interface Specification; Oct. 9, 2015, consisting of 128-pages.

Ericsson AB et al.; eCPRI Specification V2.0; Common Public Radio Interface; eCPRI Interface Specification; May 10, 2019, consisting of 109-pages.

* cited by examiner

200

FRONTHAUL NETWORK ROUTE TRACING

CROSS-REFERENCE TO RELATED APPLICATION

This application is a Submission Under 35 U.S.C. § 371 for U.S. National Stage Patent Application of International Application Number: PCT/EP2020/087719, filed Dec. 22, 2020 entitled "FRONTHAUL NETWORK ROUTE TRACING," the entirety of which is incorporated herein by reference.

TECHNICAL FIELD

Embodiments disclosed herein relate to methods and apparatus for carrying and using fronthaul network tracing information.

BACKGROUND

The third-generation partnership (3GPP) is currently working on standardization of Long Term Evolution (LTE) and Fifth Generation New Radio (5G NR) technologies. These include improvements of the air interface in the radio access network (RAN) between terminal devices and RAN nodes such as Enhanced Node B (eNB) or 5G Node B (gNB), together with mobile edge computing which enables cloud computing capabilities at the edge of the RAN in order to enhance performance.

RAN nodes have traditionally comprised radio heads or remote units (RU) connected in the same cabinet to baseband processing units (BBU) which in turn have been connected to the core network using a fronthaul network having point-to-point optical fibers. The RU may be distributed every few miles and are connected to antennas which provide radio coverage over respective geographical areas. However new architectures are evolving in which the BBU may be distributed amongst a number of RU, either at an intermediate location or distributed unit (DU) and/or centralized at a central office or unit (CU) connected directly to the core network. In order to efficiently transport traffic between the various parts of the newly distributed parts of the RAN, a fronthaul network having a number of nodes including some or all RAN nodes and with a modified architecture may be used, for example using optical fiber rings and/or a mesh of optical fibers between the geographically distributed nodes of the RAN.

One of the protocols traditionally used for the fronthaul network is Common Public Radio Interface (CPRI) which is a serial interface adapted for the point-to-point architectures previously adopted. Enhanced Common Public Radio Interface (eCPRI) is a packet based protocol carried by Ethernet packets and allows greater flexibility and transport efficiency over the more complicated fronthaul network architectures being introduced for 5G RAN. A packet based fronthaul approach allows for packet switching, statistical multiplexing, protection and so on. For example, RU covering the same or an overlapping geographical area may be connected to the BBU through diverse paths so that failure of a single link or node does not compromise RAN operation.

SUMMARY

Problems may occur as the packet fronthaul network adapts dynamically to traffic load variations, link availability and node congestion in which case it is not possible to plan and control the fronthaul network statically. For example, due to changing network conditions, RU covering the same or an overlapping geographical are may by connected to the BBU through a common link or node, representing a single point of failure risk for that radio coverage area. However, the RU, DU and CU have no or very limited knowledge of how the traffic they generate is routed and switched through the packet fronthaul network.

According to certain embodiments described herein there is provided a method, in a first radio access network (RAN) node of a fronthaul network. The method comprises recovering fronthaul network tracing information (329) from a predetermined field of the frames in response to receiving frames of a predetermined type. The fronthaul network tracing information comprises node identifier information for at least one other node of the fronthaul network through which the frame has traversed. The fronthaul network tracing information is associated with fronthaul routes of frames from other nodes through the fronthaul network to the first RAN node.

Certain embodiments provide support for determining how traffic is routed between RAN nodes so that protection risks can be identified, for example that traffic to a BBU from two or more RU covering the same area shares a common optical fiber link. This coverage area is then vulnerable to complete outage if that common link fails. This may be mitigated by for example re-routing traffic from one of the RU or assigning a different RU to the coverage area. The fronthaul network tracing information enables the determination of traffic routes through the fronthaul network that would not otherwise be discernible. By comparing this with fronthaul network topology information, these protection risks can be identified.

According to certain embodiments described herein there is provided a first RAN node which comprises communications interface circuitry configured to communicate with one or more other RAN nodes in a fronthaul network using frames, and a processor and memory containing instructions. The instructions are executable by the processor such that the node is operative to recover fronthaul network tracing information from a predetermined field of the frames in response to receiving frames of a predetermined type, the fronthaul network tracing information comprising node identifier information for at least one other node through which the frame has traversed; and to associate the fronthaul network tracing information with fronthaul routes of frames from other nodes through the fronthaul network to the first RAN node.

According to certain embodiments described herein there is provided a method in a first node of a fronthaul network. The method comprises adding fronthaul network tracing information to a predetermined field of a frame in response to receiving a frame of a predetermined type, and forwarding the frame towards a second node. The fronthaul network tracing information comprises node identifier information corresponding to the first node, the node identifier information comprising a unique fronthaul network identifier.

According to certain embodiments described herein there is provided a first node comprising communications interface circuitry configured to communicate with one or more other nodes in a fronthaul network using frames, a processor and memory containing instructions. The instructions are executable by said processor such that the node is operative to add fronthaul network tracing information to a predetermined field of a received frame in response to determining that the received frame is of a predetermined type, and to forward the frame towards a second node. The fronthaul network tracing information comprises node identifier information corresponding to the first node, the node identifier information comprising a unique fronthaul network identifier.

Certain embodiments also provide corresponding computer programs and computer program products.

BRIEF DESCRIPTION OF DRAWINGS

For a better understanding of the embodiments of the present disclosure, and to show how it may be put into effect, reference will now be made, by way of example only, to the accompanying drawings, in which.

DESCRIPTION

Figure 1:
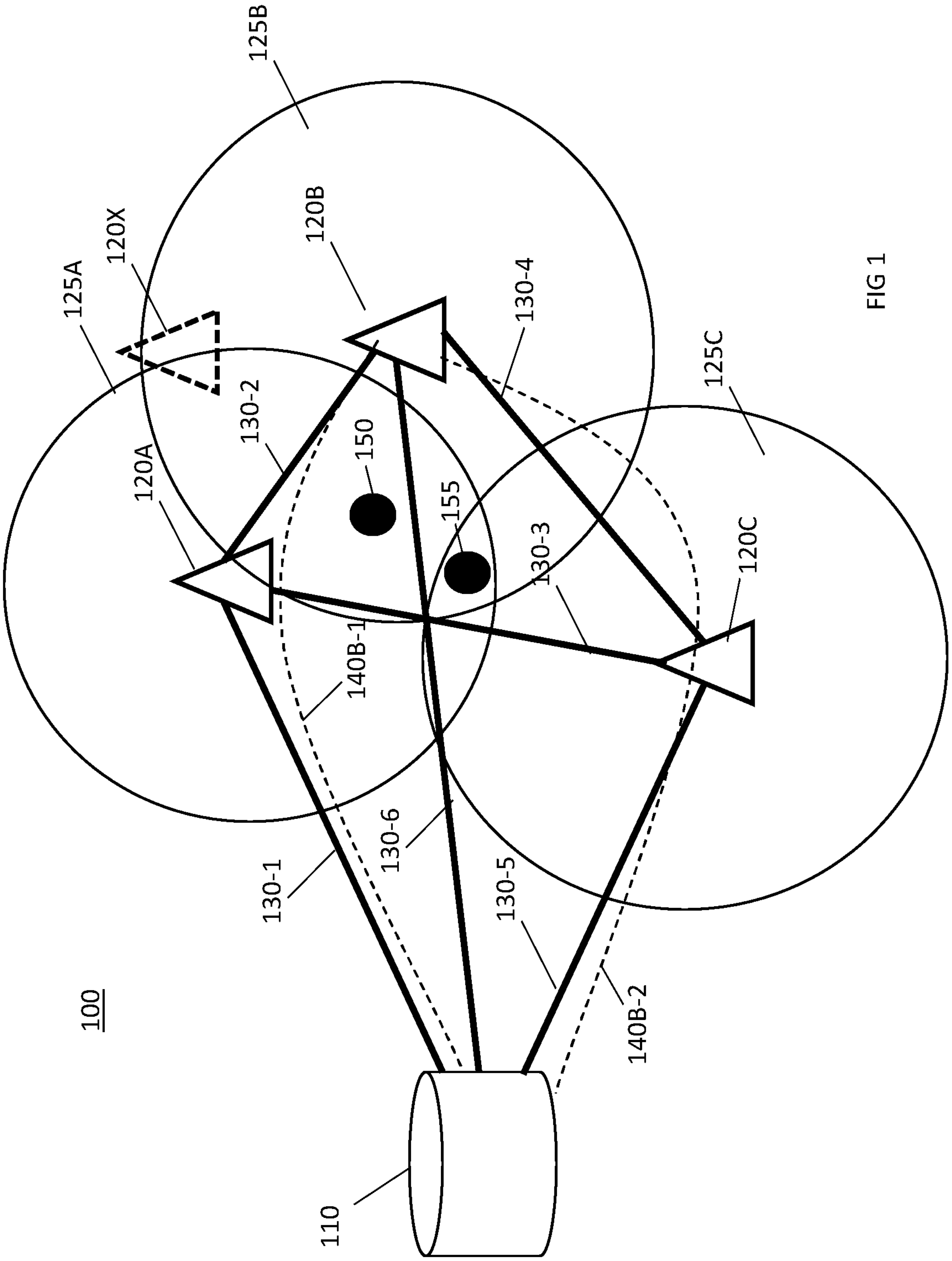
FIG. 1 is a schematic diagram illustrating a radio access network (RAN) according to some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions. Memory may be employed to storing temporary variables, holding and transfer of data between processes, non-volatile configuration settings, standard messaging formats and the like. Any suitable form of volatile memory and non-volatile storage may be employed including Random Access Memory (RAM) implemented as Metal Oxide Semiconductors (MOS) or Integrated Circuits (IC), and storage implemented as hard disk drives and flash memory.

Embodiments described herein relate to methods and apparatuses to provide Administration and Maintenance (OAM) tools for fronthaul networks. Embodiments described herein provide a tracing mechanism for determining the traffic pathways or routes between RAN nodes across the fronthaul network using existing or new fronthaul protocols. This enables transport risks to be identified and mitigated, for example by re-routing traffic and/or reallocating RU for at risk geographical areas.

The term RAN node is used herein to refer to any functional or computing process, software and/or hardware that is capable of performing the various network functions described. This may be implemented as a network element, a network node, software which may be tied to particular hardware or which may be portable across different hardware. This software may correspond to container-based groups of computing functions such as a Kubernetes pod which may be an example of a network node. However, the term network node is not limited to a Kubernetes pod or other container-based entities, nor to specific hardware.

FIG. 1 illustrates a radio access network (RAN) 100 comprising a number of remote units (RU) 120A-120C, each having radio circuitry and antennas providing respective radio coverages areas 125A-125C for communicating wirelessly with remote and/or mobile devices such as user equipment (UE). The RU are connected to each other and a baseband unit (BBU) at a central unit (CU) 110 by a fronthaul network having optical fibre links 130-1-130-6. The BBU provides baseband processing for all radio traffic for the RU 120A-120C. This means that the RU do not need their own dedicated BBU functionality which reduces their cost and allows more efficient use of the fronthaul network. Further the BBU may be split between user and control planes, with respective BBU being at different locations or using different hardware. This may allow different protection options for control plane and user plane traffic.

The fronthaul network may be one or more or a combination of point-to-point, ring and mesh networks such that there are multiple pathways across the optical links 130-1-130-3 which traffic between the RU 120A-120C and CU 110 may take. A town or other geographical area 150 is illustrated and may receive radio coverage from RU 120A and 120B. Traffic from the two RU may be routed over any of the links 130-1-130-3 according to the network configuration and dynamic traffic conditions. For example, traffic between the first RU 120A and the CU 110 may be routed over link 130-1, whilst traffic between the second RU 120B and the CU 110 may be routed over links 120-2 and 130-1 and illustrated as pathway or route 140B-1. However, as traffic from both RU 120A and 120B travels over a common link 130-1, this represents a single point of failure for the two 150. In other words, if link 130-1 fails, town 150 receives no radio coverage from either of RU 120A nor 120B.

In order to reduce this risk, traffic from RU 120B may be re-rerouted over links 130-4 and 130-5 as illustrated by route 140B-2. Routes or pathways 140B-1 and 140B-2 do not share a common link and therefore the single point of failure risk in the fronthaul network is reduced. Other routes are possible for example RU 120B to CU 110 via link 130-6 and RU 120A to CU 100 via links 130-3 and 130-5. In an alternative arrangement, for example where it is not possible to reroute traffic from two serving RU to avoid a common link, radio coverage for the town 150 may be allocated from RU 120B to another RU 120X which has alternative links available so that a common link with RU 120A can be avoided.

Figure 2:
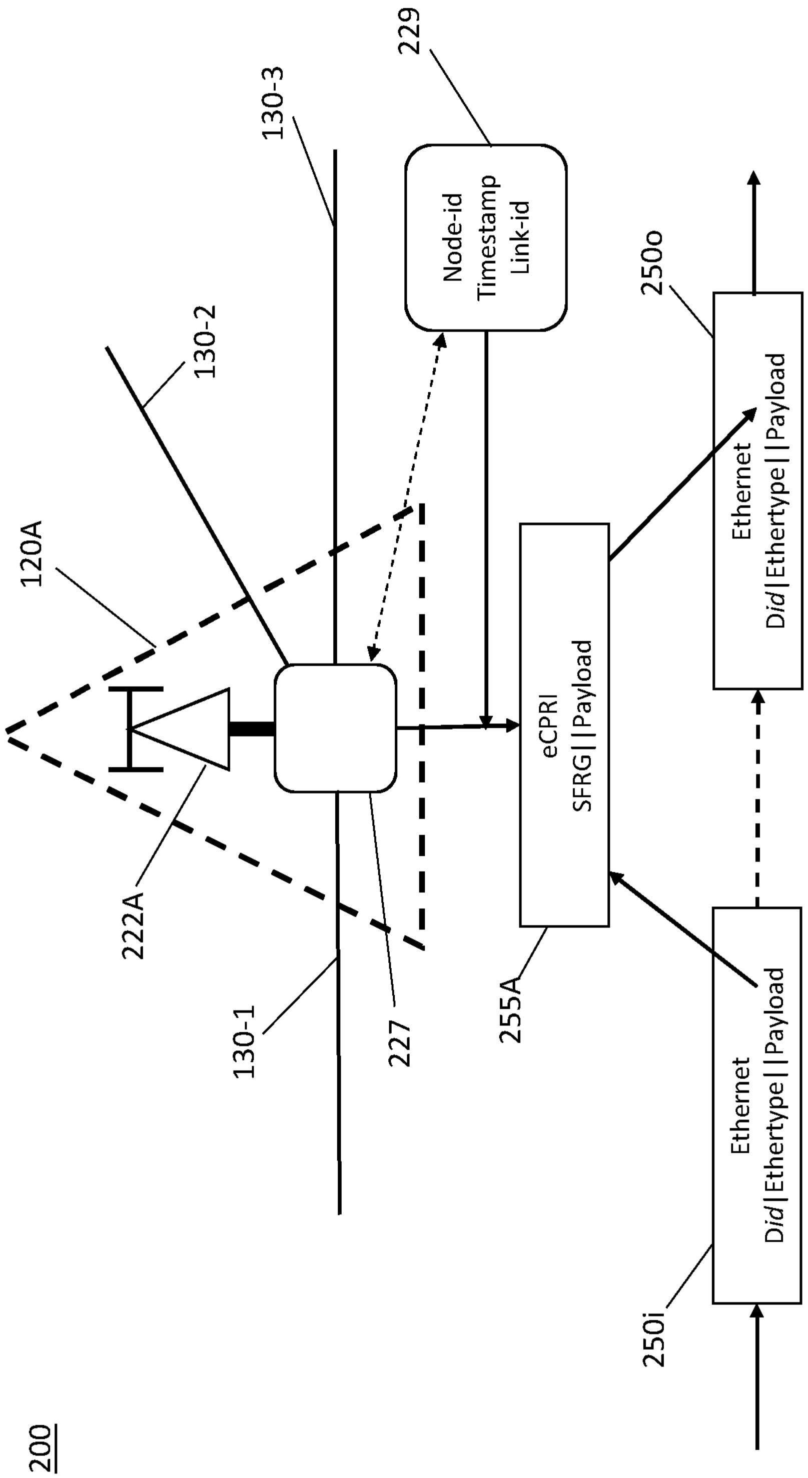
FIG. 2 is a schematic diagram illustrating operation of a source or intermediate RAN node according to some embodiments.

FIG. 2 illustrates operation of a source or intermediate node or RU according to an embodiment. The RU 120A comprises a radio head including antenna 222A and a networking function 227. The radio head 222A comprises radio circuitry for transmitting and receiving radio communications, for example according to 3GPP LTE or 5G specifications. The radio head communicates with a BBU using the eCPRI communications. The eCPRI frames are carried over the fronthaul network between the RU and CU using an Ethernet protocol. The networking function 227 encapsulates eCPRI frames (or parts of frames) from the radio head 222A into Ethernet packets addressed to the CU, which are then routed onto an optical link 130-1-130-3. In this way the RU acts as a source node.

The networking function 227 may receive Ethernet packets from other RU over the optical links and forward these to the CU. In this way the RU acts as an intermediate node. Similarly, the RU may receive packets from the CU which are de-encapsulated and recovered as eCPRI frames and forwarded to the radio head 222A. The RU 120A may also receive Ethernet packets from the CU which are addressed to other RU and these are forwarded towards that RU.

In this embodiment, the networking function 227 may periodically generate an eCPRI frame for Operations and Maintenance (OAM) use and add a Shared Fronthaul Risk Group (SFRG) field into this eCPRI frame. The provision of SFRG information enables the determination of Shared Fronthaul Risk Groups of traffic from RU providing radio coverage of a common geographical area and which share some of the same fronthaul network resources such as intermediate nodes and optical links. SFRG therefore represent a protection or redundancy risk in that should the shared network resource(s) fail or be degraded than this cannot be compensated for using an already established independent route though the fronthaul network. In this situation, it may take significant time to establish alternative routes through the network, meanwhile the service provision to the geographical area is interrupted. By identifying these SFRG, measures may be taken in advance, to ensure appropriate protection or redundancy, for example where the geographical area is a town or city.

An eCPRI frame format is shown below:

| eCPRI header | | | | | |
|---|---|---|---|---|---|
| Protocol rev | reserved | C | Message type | Payload size | eCPRI payload |

Various suitable eCPRI message types may be used, for example:

Message Type #3: Generic Data Transfer

Message Type #8 and #63: currently reserved for future use

Message Type #64-#255: Vendor Specific

The SFRG field is added to the payload of an appropriate message type. The SFRG field may comprise a node identifier for the RU, a timestamp and link identifiers as well as other SFRG information relevant to establishing the route of the packet through the fronthaul network. The node ID may be a unique network ID such as an IP address, a unique device ID such as a MAC address or an identifier assigned by the RAN based on any suitable variables such as location and role. The link identifier may uniquely identify the optical link onto which the packet is forwarded within the fronthaul network.

Where the RU is acting as an intermediate node and receives an appropriate eCPRI frame, for example one using a predetermined message type, the networking function 227 adds its own SFRG information 229 to the SFRG field containing SFRG information from other nodes through which the frame has traversed. In this way, SFRG information from each of the nodes of the fronthaul network in the route or pathway between an RU and CU are added to the SFRG field so that knowledge or a picture of the route can be built up as the frame traverses the fronthaul network.

The eCPRI frames are carried over the fronthaul network using Ethernet packets. The Ethernet packets may flag whether they are carrying eCPRI frames having SFRG fields so that the RU knows to decode the eCPRI frame. Otherwise, the Ethernet packet may be forwarded in the usual way. The EtherType header field of the Ethernet packets may be used to flag whether they are carrying eCPRI frames to which SFRG information can be added, for example by containing a predetermined value.

Not all RU may be adapted to operate according to the embodiment and in this case of legacy equipment the Ethernet packets will be handled in the usual way and may therefore just pass through the node without changing the eCPRI frames they are carrying. Nodes not recognising the predetermined value of the EtherType field in the Ethernet packet will just ignore it. Nodes implementing the embodiment will recognise the predetermined value of the EtherType field and decode the Ethernet payload to recover the eCPRI frame and add SFRG information to the SFRG field. This is illustrated in FIG. 2.

The networking function 227 receives an incoming Ethernet packet 250*i* comprising a destination address Did, and EtherType header field, and a payload. If the EtherType field matches a predetermined value, the payload is decoded to recover the eCPRI packet 255A. SFRG information 229 associated with the node RU of the networking function 227 is added to the SFRG field in the payload of the eCPRI packet 255A. The modified eCPRI packet is then encoded into the payload of an Ethernet packet 2500, having the same destination address Did and EtherType as the incoming Ethernet packet 250*i*, and the outgoing packet 250*o* is forwarded onto an optical link towards its destination.

Figure 3:
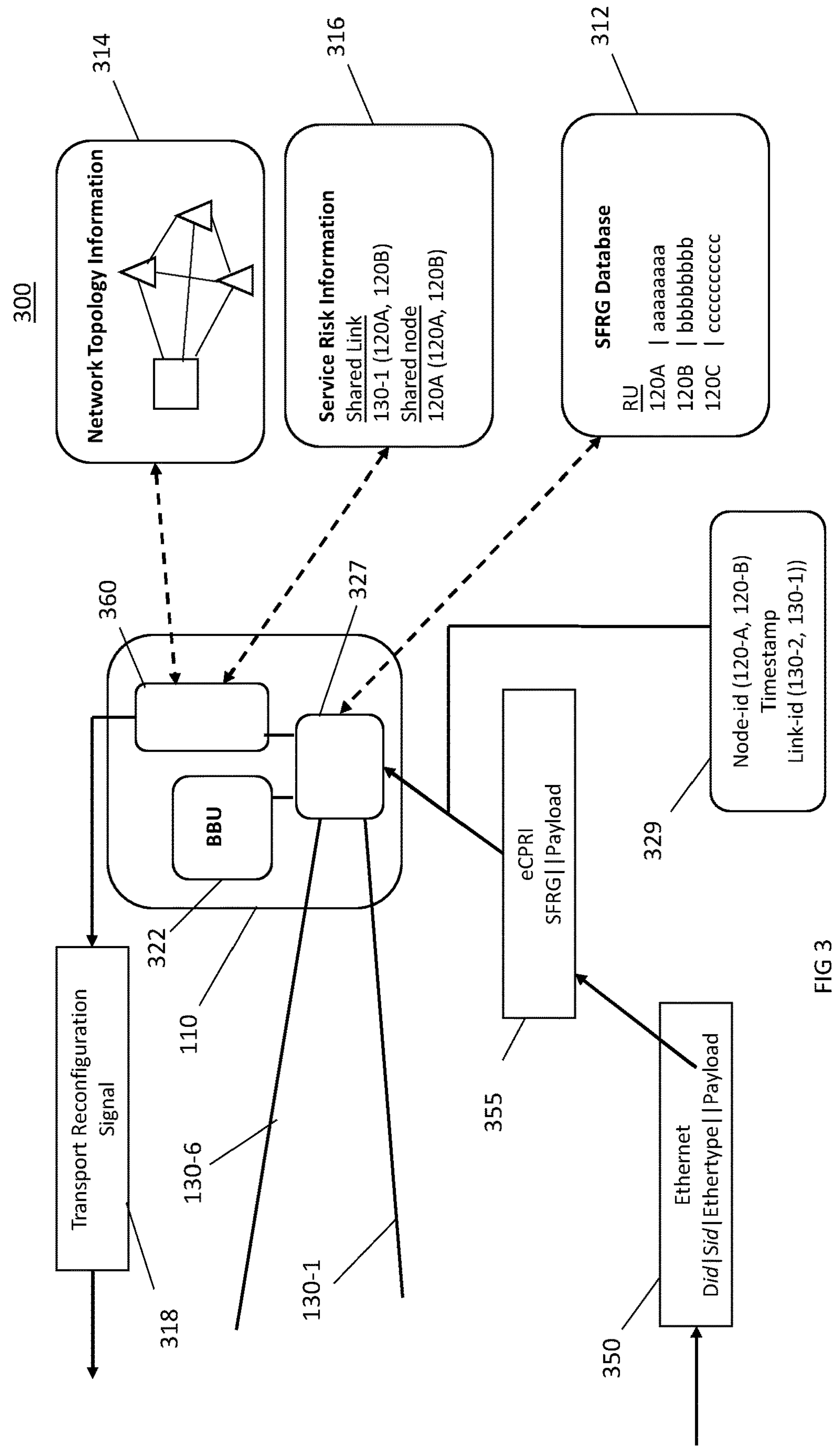
FIG. 3 is a schematic diagram illustrating operation of a destination RAN node according to some embodiments.

FIG. 3 illustrates a destination node according to an embodiment. The destination node 110 comprises a baseband unit (BBU) 322 and a networking function 327 and may be centrally located within the RAN 100, or it may be located with or near a RU with the BBU servicing a number of nearby RU. The node 110 may also comprise a shared fronthaul risk group (SFRG) function 360 which analyses and may act upon shared identified fronthaul risk groups (SFRG).

The networking function 327 receives Ethernet packets from RU over the optical links, decodes the eCPRI frames and forwards these to the BBU 322 for baseband processing. Similarly eCPRI frames generated by the BBU 322 destinated for RU are encapsulated into Ethernet packets by the networking function 327 and sent over the fronthaul network to the RU. Received OAM type eCPRI frames containing the SFRG information are processed differently. Ethernet packets carrying these frames may be identified by using the EtherType header field noted previously and the decoded eCPRI frame is recovered and its SFRG field read to recover the SFRG information corresponding to the nodes traversed by the eCPRI frame on its journey from the RU to the destination node 110.

The SFRG information may be added to a SFRG Information database 312 or other data store containing SFRG information for each RU 120A, 120B, 120C. The SFRG information corresponds to routes or pathways 140B-1, 140B-2 through the fronthaul network which OAM type eCPRI frames have taken to get to the destination node 110. These routes may change over time due to changes in data traffic conditions over the network. The SFRG information may simply be stored as node ID's timestamps and link ID's associated with each eCPRI frame having the SFRG field.

The SFRG information 312 may be analysed to determine shared fronthaul risk groups (SFRG) by the SFRG function 360. This functionality 360 may be located within the destination node 110 or it may be located elsewhere, for example a fronthaul network administration node (not shown) which receives the SFRG information from the destination node 110. The SFRG function 360 has network topology information 314 about the fronthaul network topology, in other words the various nodes and their optical links between each other. The topology information may include the geographical locations of the nodes, their respective radio coverage areas and their unique network identifiers, unique network identifiers for the links as well as which nodes each link is connected to.

The SFRG information for each RU may be analysed to determine the route or pathway through the fronthaul network. For example, using node ID's alone, the following pathway information may be determined using SFRG information from the latest eCPRI:

| Source Node | Nodes in pathway | Links in pathway |
|---|---|---|
| 120A | 120A, 110 | 130-1 |
| 120B | 120B, 120A, 110 | 130-2, 130-1 |
| 120C | 120C, 110 | 130-5 |

Link information may be determined using the topology information 314, or in some embodiments may be included in this SFRG information in the fields of the eCPRI frames. The pathway information can then be used to determine service risk information, 316, such as RU serving the same or overlapping geographical area sharing a common node or link.

In the simple above example, it can be seen that RU 120A and 120B share link 130-1 and also the interfacing function 227 of node 120A. Where RU 120A and 120B are providing radio coverage to the same or overlapping geographical area, such as town 150, link 130-1 and node 120A represent a single point of failure risk. In other words, were either of these parts of the fronthaul network to fail, radio coverage for the town 150 would be interrupted as neither RU 120A nor 120B could provide coverage until their traffic was rerouted. This risk could be reduced by rerouting traffic from RU 120A according to one of the following pathways: 1) link 130-6 to node 110; 2) link 130-4 to node 120C then link 130-5 to node 110; 3) link 130-2 to node 120A then link 130-3 to node 120C then link 130-5 to node 110. Routes 1) and 2) eliminate the single point of failure risks at node 120A and link 130-1 whilst route 3) only eliminates the single point of failure risk at link 130-1.

Referring again also to FIG. 1, a second town 155 has radio coverage provided by RU's 120A, 120B, 120C. The BBU may communicate with RU 120A via a number of pathways, including for example P1A using link 130-1, P2A using links 130-2 and 130-6, P3A using links 130-3 and 130-5. BUU may communicate with RU 120B for example via pathways P1B using links 130-1 and 130-2, P2B using link 130-6, and P3B using links 130-4 and 130-5. BUU may communicate with RU 120C for example via pathways P1C using links 130-4 and 130-2 and 130-1, P2C using links 130-3 and 130-1, P3C using link 130-5. If the traffic is cascaded over the three RU, they will share SFRG (130-1, 130-2, 130-4) creating a major single point of failure on link 130-1 and a potential degrade of performance in case of failure of link 130-2.

Without the SFRG information provided by the embodiments, the RAN is unaware of these transport risks. With the SFRG information and correlation with topology information, pre-emptive corrective action can be taken. The SFRG function 360 may signal a fronthaul reconfiguration so that for example traffic from 120B is routed through link 130-6. If reconfiguration is not possible, a different RU may be allocated to service the at risk geographical area. For example, radio coverage of town 155 may be switched from RU 120A and 120B to 120A and 120C. In other cases, it may be decided that the risk is acceptable, for example in the case of a remote low priority town.

The networking function 327 receives an incoming Ethernet packet 350 comprising a destination address Did, source address Sid, EtherType header field, and a payload. If the EtherType field matches a predetermined value, this indicates that an OAM type eCPRI is encapsulated. The payload is decoded to recover the eCPRI frame 355. If the eCPRI frame is standard it is forwarded to the BBU for processing. If the eCPRI frame 355 is of the OAM type of the embodiment, the SFRG information 329 associated with the node RU corresponding to the source ID Sid is retrieved from the SFRG field in the payload of the eCPRI frame 355 and the frame discarded. As previously noted the SFRG information 329 is added by the networking function 327 to the SFRG database 312.

Figure 4:
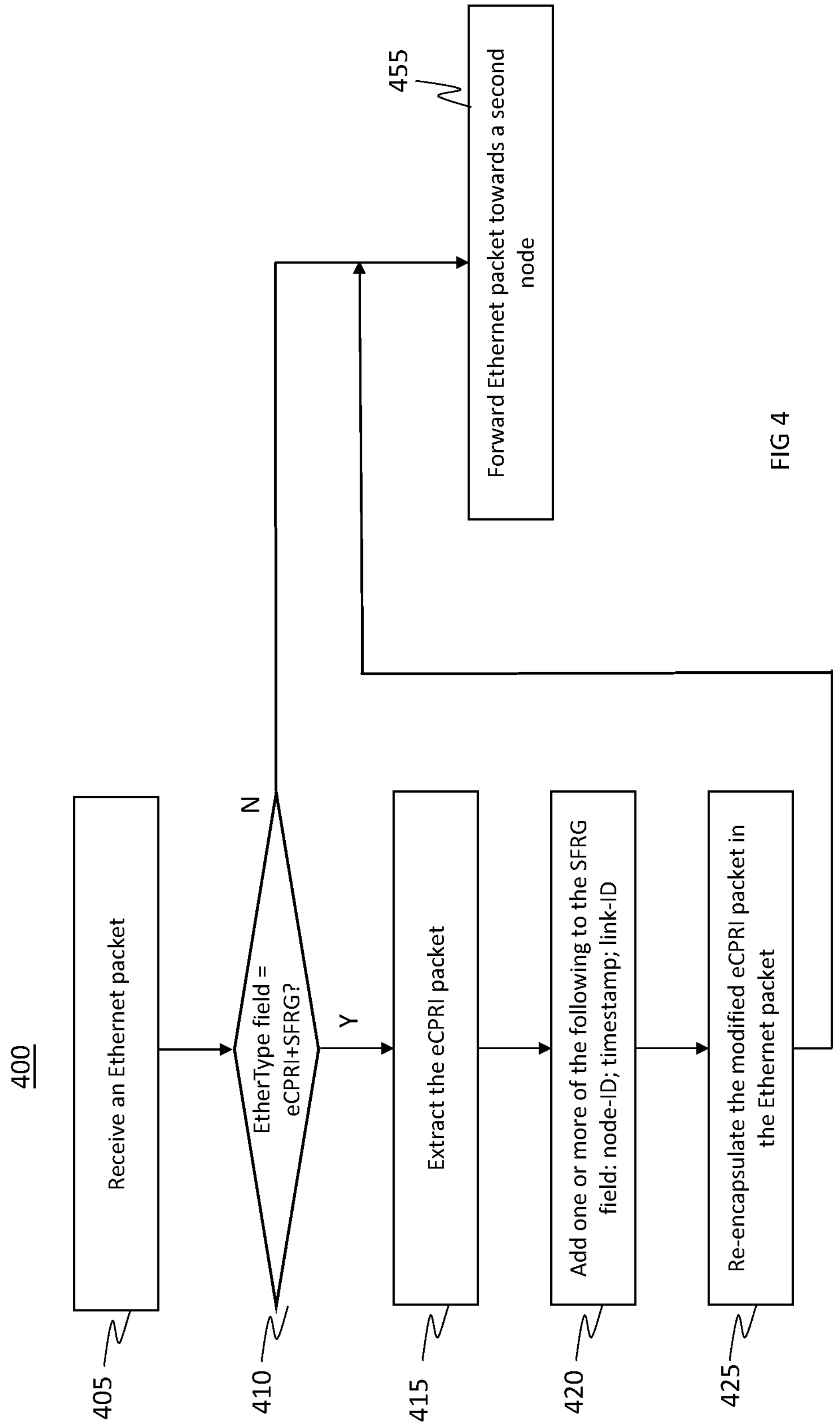
FIG. 4 is flow diagram illustrating a method of operating an intermediate RAN node according to some embodiments.

FIG. 4 illustrates a method 400 of operating an intermediate node in a fronthaul network according to an embodiment. The method may be implemented by the networking function 227 of the node of FIG. 2, although it may alternatively be implemented by any suitable networking and/or computing equipment. At step 405, the method receives an Ethernet packet. This may be implemented using known Ethernet interfacing equipment and protocols. At step 410, the method determines whether the EtherType header field of the Ethernet packet has a predetermined value corresponding to an eCPRI frame having a SFRG field. If this is not the case, the Ethernet packet is forwarded on towards its destination address using known networking and routing protocols at step 455.

If the EtherType field comprises the predetermined value, this corresponds to receiving a eCPRI frame having a SFRG field, and the method moves to step 415. The predetermined type of frame is then de encapsulated or decoded to extract and recover the eCPRI frame. At step 420, fronthaul network tracing or SFRG information associated with the intermediate node is added to the SFRG field of the eCPRI frame. This fronthaul network tracing (SFRG) information may include a unique identifier for the intermediate node, a timestamp, and a unique identifier for the link over which the Ethernet packet was received and/or over which the eCPRI frame will be forwarded. The unique node identifier may be a layer 3 or network layer address which is unique within the fronthaul network, a MAC address which is unique for some component of the node, or a unique RAN identifier which incorporate information about the node such as location or role for example.

At step 425, the modified eCPRI frame with the added fronthaul network tracing information in its SFRG field is encapsulated in an Ethernet packet. The same source and destination address are used as the received Ethernet packet and the same EtherType value. At step 455, the new Ethernet packet is forwarded towards its final destination.

Figure 5:
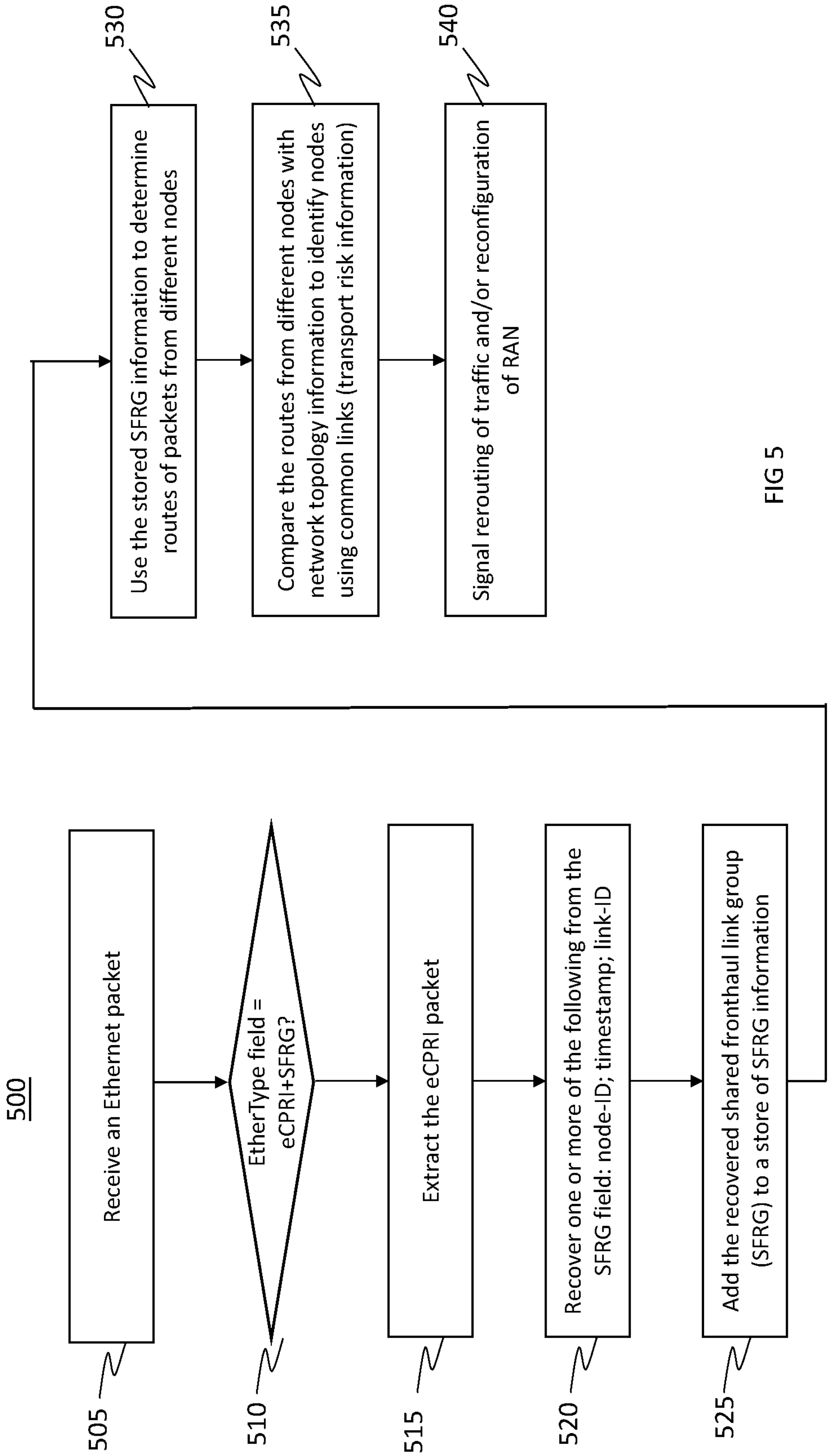
FIG. 5 is a flow diagram illustrating a method of operating a destination RAN node according to some embodiments.

FIG. 5 illustrates a method 500 of operating a destination node in a fronthaul network according to an embodiment. The method may be implemented by the networking function 327 of the node 110 of FIG. 2, although it may alternatively be implemented by any suitable networking and/or computing equipment. The destination node may comprise a BBU.

At step 505, the method receives an Ethernet packet. This may be implemented using known Ethernet interfacing equipment and protocols. At step 510, the method determines whether the EtherType header field of the Ethernet packet has a predetermined value corresponding to an eCPRI frame having a SFRG field. If this is not the case, the Ethernet packet may be handled in a standard manner, for example if the EtherType indicates that it is carrying an eCPRI frame without SFRG information, then the eCPRI frame may be recovered and forwarded to a BBU where it is processed normally.

If the EtherType field comprises the predetermined value, this corresponds to receiving a predetermined type of eCPRI frame having a SFRG field, and the method moves to step 515. The predetermined type of frame is then de-encapsulated or decoded to extract and recover the eCPRI frame. At step 520, fronthaul network tracing or SFRG information contained in the SFRG field of the eCPRI frame is extracted or recovered. As noted, this may comprise node identifiers for nodes through which the frame has traversed. The SFRG field may also comprise link identifiers for links over which the eCPRI frame has travelled through the fronthaul network. Additional information may also be included, such as timestamps associated with processing by each of the intermediate nodes.

At step 525, the recovered SFRG or fronthaul network tracing information is added to a fronthaul network tracing information store such as a SFRG database which contains SFRG information associated with a number of different RU across the RAN. This SFRG information for each RU indicates which intermediate nodes have been involved in transporting the eCPRI frame from the RU to the destination node. This may include historical route data which has evolved over time due to changes in fronthaul network and/or radio conditions. Additional information may also be included such as the links of the fronthaul network used to transport the frames as well as processing times (timestamps) of the intermediate nodes. OAM type eCPRI frames containing SFRG information may be sent periodically from each RU towards the destination node so that transport routes through the fronthaul network can be monitored. Alternatively, the RU may be requested to send these OAM type eCPRI frames in response to commands from the destination node, a separate network administrator or in response to certain detected fronthaul network conditions.

At step 530, the method uses the combined or stored SFRG information to determine the routes through the fronthaul network of the eCPRI frames from each RU (316). The OAM eCPRI frames containing the SFRG information act as a proxy for all eCPRI frames travelling through the fronthaul network from the same RU node. The node identifiers in the SFRG fields of the eCPRI from different nodes act as fronthaul network tracing information and are used to determine their routes through the fronthaul network. This step 530, and subsequent steps of the method 500, may be performed on the same destination node, for example containing the BBU, or they may be performed on a different node such as a RAN controller. In the latter case, the recovered SFRG information may be forwarded from the destination node to the node carrying out the route determination.

At step 535, the method correlates the routes with network topology information (314) of the fronthaul network to identify service risk information (316) or shared fronthaul risk groups (SFRG). A geographical area such as a town may be served by radio coverage from a number of nearby RU with user traffic being shared amongst the RU. In the event of one of the RU failing, traffic may be picked up by the other serving RU. However, if all RU serving the town fail, then network coverage is interrupted. The risk of this occurring will depend on a number of factors including fronthaul network routes used by the RU to communicate a BBU remotely located from the RU. The impact of such an interruption may depend on a number of factors such as the importance and size of the town, its location and the type of industries or other activities supported there.

SFRG may be associated with a location which is served by a plurality of RU. Where the fronthaul network routes of these RU use a common link and/or intermediate node, this represents a single point of failure risk. In other words, where a single link fails, this may result in failure of multiple (possibly all) RU to service the location. Identifying such risks enables pre-emptive action to be taken to ensure adequate redundancy in service provision. The risks may be assessed according to different criteria, for example: critical—where a single point failure will result in no coverage to a location; moderate—where a single point failure will result in loss of some but not all RU covering a location; and low—where there is no single point of failure. The moderate level risk may result in a degradation of service but not a complete failure. These risks to each location may be assessed against a range of key performance indicators (KPI) such as the relative importance of the location. Where a critical risk is determined for an important city, corrective action may be required. Where a medium risk is determined for a medium town of medium importance, this may be tolerated. Similarly where a critical risk is determined for a small town this may be tolerated or corrected to a medium risk. The risks to each location may be traded with other locations to determine an appropriate corrective strategy.

Once a determination has been made on corrective actions, the method moves to step 540 where traffic rerouting and/or reallocation of RU is signalled. For example, traffic from certain RU may be rerouted over different links to avoid a single point of failure. Additionally, or alternatively, different RU may be allocated to a location considered at risk. For example, where it may be difficult to reroute traffic from two RU covering a location, an additional RU may be allocated to also cover that location.

The embodiment addresses some issues which the use of packet based fronthaul networks introduces. Packet base transport provides a high level of flexibility which is typical in packet networks, enabling features such as statistical multiplexing, packet switching, protection, etc. However, since RUs, DUs and CUs have no or very limited knowledge on how the traffic they generate is routed and switched through the packet network, these advantages can be exploited with an only limited extent. The embodiment provides greater routing knowledge leading to the identification of transport risks which may be assessed and addressed.

To ensure service continuity, the connection of base station radios such as gNB covering the same area through diverse paths reduces the impact of the failure of a single base station and therefore node does not compromise the RAN operation. If the RAN could ensure such a diversification of the fronthaul services, it could also properly deploy services preserving their continuity. It is noted that Ethernet switched paths change dynamically depending on traffic load variations, link availability and node congestion, therefore it is not possible to plan and control the transport network statically.

Figure 6:
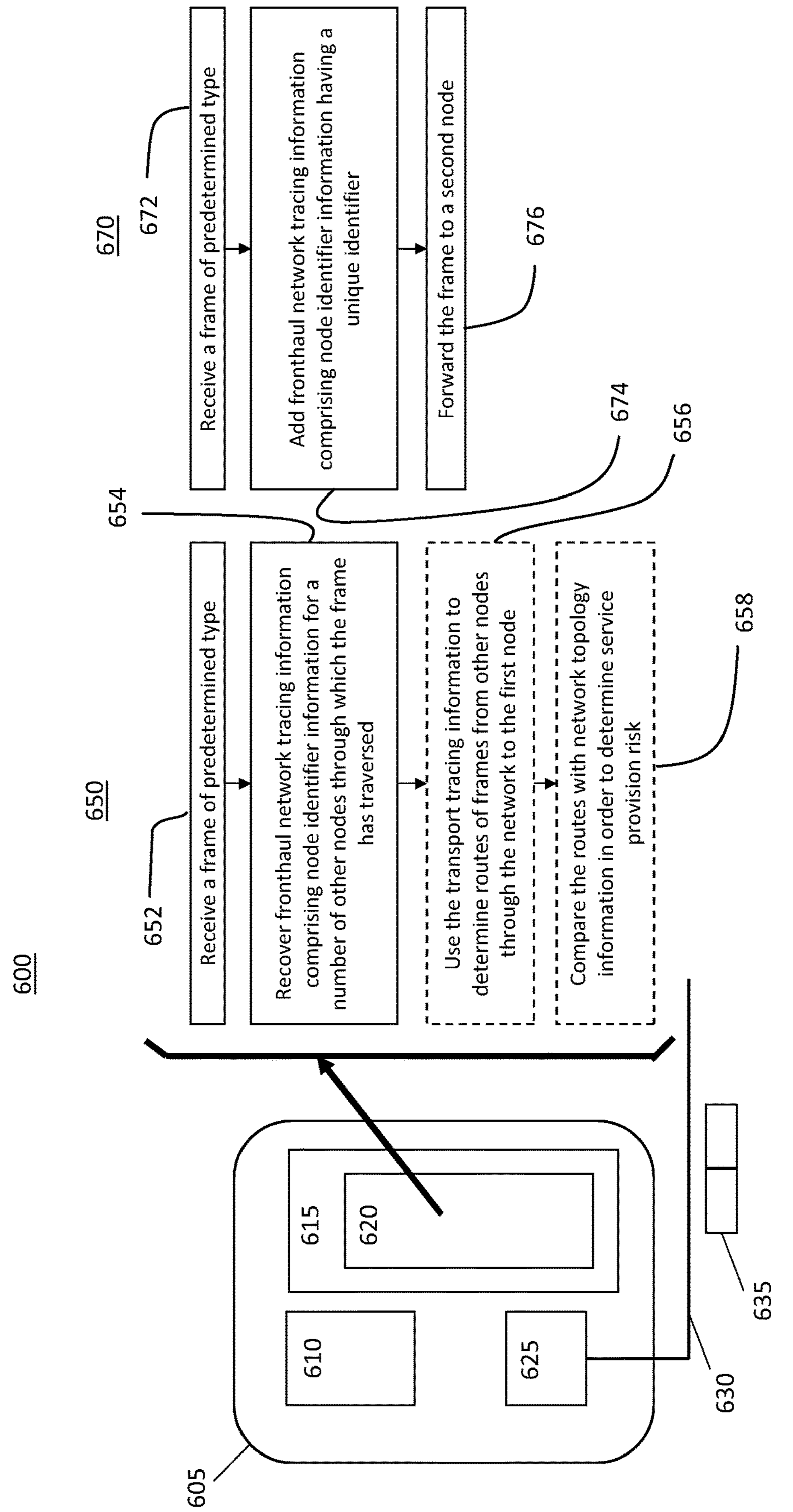
FIG. 6 is a schematic diagram illustrating the architecture of apparatus according to some embodiments.

The embodiment effectively provides a common Radio and Transport Operation, Administration and Maintenance (OAM) toolset for packet fronthaul networks to exchange detailed information about the network status. It also does this whilst imposing a minimal set of additional requirements which do not impact legacy equipment FIG. 6 illustrates an apparatus according to an embodiment which may be used as a source, intermediate or destination node. The apparatus 600 comprises a processor 610, memory 615 containing computer program instructions 620 which when executed by the processor cause the processor to carry out methods of the embodiments. The apparatus also comprises a communications interface 625 connected to a communications link and which exchanges communications messages 635 with other apparatus. Example instructions 650 for a destination node and 670 for a source or intermediate node are illustrated and which includes may be performed by the processor 610.

When acting as a destination node, at 652, the apparatus receives a frame of a predetermined type such as an eCPRI frame having a SFRG field. When carried by an Ethernet packet, this may be indicated by a predetermined value of the EtherType field. In response to receiving the frame of predetermined type, at 654, the apparatus recovers transport network tracing information which comprises node identifier information from at least one other node through which the frame has traversed. The transport network tracing information may be SFRG information contained in the SFRG field.

When used to analyze the tracing information to identify service provision risks, the apparatus at 656 uses the SFRG information to determine transport routes of frames from a number of nodes through the fronthaul network to the apparatus acting as destination node. At 658, the apparatus 600 compares the routes or pathways with network topology information to determine service provision risks for example as previously described.

When acting as a source or intermediate node, at 672, the apparatus receives a frame of a predetermined type. In the case of an intermediate node, this may be a eCPRI frame having a SFRG field. When received in an Ethernet packet, this may be indicated by an EtherType value having a predetermined value. In the case of a source node, a eCPRI frame having a predetermined message type may be received.

At 674, fronthaul network tracing information such as SFRG information is added to the SFRG field. Where there is no SFRG field, as in the case of a source node, such a field is added to the payload of the eCPRI frame. The SFRG information comprises a unique node identifier associated with the apparatus and may comprise other information such as link identifiers and a timestamp.

At 676, the eCPRI frame with added SFRG information is forwarded to a destination node. This may be implemented by encapsulating the frame in an Ethernet packet and setting the EtherType value to a predetermined value.

The embodiments provide a number of advantages including improving the RAN service continuity by identifying single point of failure risks in the fronthaul network and in response selecting diverse paths to cover the same RAN service area. This may be implemented by changing packet routes through the fronthaul network from RU covering the same RAN service area and/or by changing the RU allocated to cover the RAN service area. Performance of a packet fronthaul network may be directly controlled from the RAN nodes, independent of the underlying transport technology. The embodiments are backwards compatible with existing Ethernet switching—legacy equipment will simply ignore Ethernet packets having the EtherType exception used. Transport of eCPRI frames through an Ethernet switched fronthaul network is more observable and the embodiments provide in-band communication between the radio and transport network—no need for additional control channels. More generally, the embodiments provide an Operation, Administration and Maintenance (OAM) toolset for packet fronthaul networks to exchange detailed information about the network status. It also does this whilst imposing a minimal set of additional requirements which do not impact legacy equipment Whilst embodiments have been described in terms of eCPRI frames carried by Ethernet packets, other protocols may alternatively be used. Point-to-point circuit switched fronthaul networks may also benefit from the approach of the embodiments. For example, the fast C&M fields in CPRI hyperframe may be used to carry SFRG information. These fields can form a high data rate Ethernet Channel which can be flexibly configured by the pointer in control BYTE #Z. 194.0. Up to 192 control words in the vendor specific subchannels 16 to 63 of one hyperframe may be employed. A CPRI protocol extension may be used to include control words. Furthermore, other alternative protocols may also benefit from the claimed subject matter.

Whilst embodiments have been described as having collocated functionality in a node, some of the functionality may be implemented remotely or distributed across nodes. For example, the SFRG function 360 may be instantiated in cloud environments such as Docker, Kubernetes or Spark. This and other functions may be implemented in a cloud environment and receive data such as SFRG information from the destination node 110. Alternatively, they may be implemented in dedicated hardware or within the destination node equipment together with the BBU and interface function 337.

Modifications and other variants of the described embodiment(s) will come to mind to one skilled in the art having the benefit of the teachings presented in the foregoing descriptions and the associated drawings. Therefore, it is understood that the embodiment(s) is/are not limited to the specific examples disclosed and that modifications and other variants are intended to be included within the scope of this disclosure. Although specific terms may be employed herein, they are used in a generic and descriptive sense only and not for purposes of limitation.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed to limit their scope.

The invention claimed is:

1. A method, in a first radio access network, RAN, node of a fronthaul network, the method comprising:

in response to receiving frames of a predetermined type, recovering fronthaul network tracing information from a predetermined field of the frames, the fronthaul network tracing information comprising node identifier information for at least one other node of the fronthaul network through which the frames have traversed;

associating the fronthaul network tracing information with routes of frames from other RAN nodes through the fronthaul network to the first RAN node; and comparing the fronthaul routes with fronthaul network topology information in order to determine shared fronthaul risk group information.

2. The method of claim 1, wherein the shared fronthaul risk group information comprises information to identify single points of failure of nodes or links in the fronthaul network which transport frames from two or more other RAN nodes to the first RAN node.

3. The method of claim 1, comprising signaling a second node to reconfigure transport of frames through the fronthaul network depending on the shared fronthaul risk group information.

4. The method of claim 1, comprising signaling a second RAN node to disconnect from the first RAN node and a third RAN node to connect with the first RAN node depending on the shared fronthaul risk group information.

5. The method of claim 1, wherein the fronthaul network tracing information comprises a timestamp corresponding to a time when the frame was processed by another node.

6. The method of claim 1, where the fronthaul network tracing information comprises link identifier information corresponding to a link used to forward the frame to or from another node.

7. A first RAN node comprising:

communications interface circuitry configured to communicate with one or more other RAN nodes in a fronthaul network using frames; and a processor and memory, the memory containing instructions executable by the processor to cause the first RAN node to:

recover fronthaul network tracing information from a predetermined field of the frames in response to receiving frames of a predetermined type, the fronthaul network tracing information comprising node identifier information for at least one other node through which the frames have traversed;

associate the fronthaul network tracing information with routes of frames from other RAN nodes through the fronthaul network to the first RAN node; and compare the fronthaul routes with fronthaul network topology information in order to determine shared fronthaul risk group information.

8. The first RAN node of claim 7, wherein the first RAN node is further caused to signal a second RAN node to disconnect from the first RAN node and a third RAN node to connect with the first RAN node depending on the shared fronthaul risk group information.

9. The first RAN node of claim 7, wherein the node identifier information comprises one or more of one or both of the following:

layer 2 or layer 3 identifiers for the other nodes; and one or both location and role based identifiers for the other nodes.

10. The first RAN node of claim 7, wherein the fronthaul network tracing information comprises a timestamp corresponding to a time when the frame was processed by another node.

11. A method in a first node of a fronthaul network, the method comprising:

in response to receiving a frame of a predetermined type, adding fronthaul network tracing information to a predetermined field of the frame;

forwarding the frame towards a second node for the second node to associate the fronthaul network tracing information with routes of frames from other nodes through the fronthaul network to the second node and compare the fronthaul routes with fronthaul network topology information in order to determine shared fronthaul risk group information; and the fronthaul network tracing information comprising node identifier information corresponding to the first node, the node identifier information comprising a unique fronthaul network identifier.

12. The method of claim 11, wherein the fronthaul network tracing information comprises a timestamp corresponding to a time when the frame was processed by the first node.

13. The method of claim 11, where the fronthaul network tracing information comprises link identifier information corresponding to a link used to forward the frame to or from the first node.

14. The method of claim 11, wherein the fronthaul network is a packet network and the predetermined type of frame is carried by a packet having a header field containing a predetermined value.

15. A first node comprising:

communications interface circuitry configured to communicate with one or more other nodes in a fronthaul network using frames;

a processor and memory, the memory containing instructions executable by the processor to cause the first node to:

add fronthaul network tracing information to a predetermined field of a received frame in response to determining that the received frame is of a predetermined type, forward the frame towards a second node for the second node to associate the fronthaul network tracing information with routes of frames from other nodes through the fronthaul network to the second node and compare the fronthaul routes with fronthaul network topology information in order to determine shared fronthaul risk group information; and the fronthaul network tracing information comprising node identifier information corresponding to the first node, the node identifier information comprising a unique fronthaul network identifier.

16. The first node of claim 15, wherein the fronthaul network tracing information comprises a timestamp corresponding to a time when the frame was processed by the first node.

17. The first node of claim 15, where the fronthaul network tracing information comprises link identifier information corresponding to a link used to forward the frame to or from the first node.

18. A non-transitory computer readable media having stored thereon a computer program comprising instructions which, when executed on a processor, cause the processor to carry out a method, the method comprising:

in response to receiving frames of a predetermined type, recovering fronthaul network tracing information from a predetermined field of the frames, the fronthaul network tracing information comprising node identifier information for at least one other node of the fronthaul network through which the frames have traversed;

associating the fronthaul network tracing information with routes of frames from other RAN nodes through the fronthaul network to a first RAN node; and comparing the fronthaul routes with fronthaul network topology information in order to determine shared fronthaul risk group information.

* * * * *